US011917069B1

(12) United States Patent
Chu et al.

(10) Patent No.: US 11,917,069 B1
(45) Date of Patent: *Feb. 27, 2024

(54) METHODS AND SYSTEMS FOR SECURE USER AUTHENTICATION

(71) Applicant: CITICORP CREDIT SERVICES, INC. (USA), Jacksonville, FL (US)

(72) Inventors: Ronald Chu, Los Angeles, CA (US); Mark Kogen, Torrance, CA (US); Warren Tan, Thousand Oaks, CA (US); Simon Ma, Torrance, CA (US); Yosif Smushkovich, Santa Monica, CA (US); Gerry Glindro, Carson, CA (US); Jeffrey Nicholas, Los Angeles, CA (US)

(73) Assignee: CITICORP CREDIT SERVICES, INC. (USA), Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,515

(22) Filed: Jun. 29, 2023

Related U.S. Application Data

(63) Continuation of application No. 17/845,954, filed on Jun. 21, 2022, which is a continuation of application No. 15/677,894, filed on Aug. 15, 2017, now Pat. No. 11,394,553, which is a continuation of application No. 13/019,333, filed on Feb. 2, 2011, now Pat. No. 9,768,963, which is a continuation of application No.
(Continued)

(51) Int. Cl.
*H04L 29/00* (2006.01)
*H04L 9/32* (2006.01)

(52) U.S. Cl.
CPC .................. *H04L 9/3228* (2013.01)

(58) Field of Classification Search
CPC ...................................... H04L 9/3228
See application file for complete search history.

(56) References Cited

U.S. PATENT DOCUMENTS

| 4,599,489 A | 7/1986 | Cargile |
| 4,609,777 A | 9/1986 | Cargile |

(Continued)

FOREIGN PATENT DOCUMENTS

| WO | WO-00/25292 A1 | 5/2000 |
| WO | WO-00/25292 A2 | 5/2000 |

(Continued)

*Primary Examiner* — Ghazal B Shehni
(74) *Attorney, Agent, or Firm* — Foley & Lardner LLP

(57) ABSTRACT

Secure user authentication using a OTP involve pre-storing an application on a first device for generating a valid OTP for the user responsive to receiving entry of a valid PIN, no part of the valid PIN is stored on the first device and pre-storing on a back-end server the valid PIN and a valid shared secret for the user. Upon receiving entry of a purported PIN, a purported shared secret is dynamically synthesized on the first device by the application based on the purported PIN and a purported OTP is generated on the first device. When entry of the purported OTP is received by the server in an attempt to log on the server from a second device, the server cryptographically calculates a window of OTPs, and logs on to the server from the second device is allowed if the calculated window of OTPs corresponds to the received OTP.

20 Claims, 5 Drawing Sheets

Related U.S. Application Data

11/789,054, filed on Apr. 23, 2007, now Pat. No. 9,002,750, which is a continuation-in-part of application No. 11/636,839, filed on Dec. 11, 2006, now Pat. No. 7,904,946.

(60) Provisional application No. 60/784,970, filed on Mar. 22, 2006, provisional application No. 60/749,230, filed on Dec. 9, 2005.

(56) References Cited

U.S. PATENT DOCUMENTS

| | | |
|---|---|---|
| 4,800,590 A | 1/1989 | Vaughan |
| 4,819,267 A | 4/1989 | Cargile et al. |
| 5,280,527 A | 1/1994 | Gullman et al. |
| 5,363,448 A | 11/1994 | Koopman et al. |
| 5,481,611 A | 1/1996 | Owens et al. |
| 5,657,388 A | 8/1997 | Weiss |
| 5,737,421 A | 4/1998 | Audebert |
| 5,802,176 A | 9/1998 | Audebert |
| 5,838,458 A | 11/1998 | Tsai |
| 5,887,065 A | 3/1999 | Audebert |
| 5,937,068 A | 8/1999 | Audebert |
| 5,953,420 A | 9/1999 | Matyas et al. |
| 6,044,154 A | 3/2000 | Kelly |
| 6,067,621 A | 5/2000 | Yu et al. |
| 6,173,400 B1 | 1/2001 | Perlman et al. |
| 6,266,413 B1 | 7/2001 | Shefi |
| 6,317,838 B1 | 11/2001 | Baize |
| 6,327,662 B1 | 12/2001 | Araujo |
| 6,338,140 B1 | 1/2002 | Owens et al. |
| 6,343,361 B1 | 1/2002 | Nendell et al. |
| 6,445,794 B1 | 9/2002 | Shefi |
| 6,480,958 B1 | 11/2002 | Harrington |
| 6,694,436 B1 | 2/2004 | Audebert |
| 6,731,731 B1 | 5/2004 | Ueshima |
| 6,732,278 B2 | 5/2004 | Baird et al. |
| 6,829,356 B1 | 12/2004 | Ford |
| 6,880,079 B2 | 4/2005 | Kefford et al. |
| 6,904,526 B1 | 6/2005 | Hongwei |
| 6,908,030 B2 | 6/2005 | Rajasekaran et al. |
| 6,928,558 B1 | 8/2005 | Allahwerdi et al. |
| 7,904,946 B1 | 3/2011 | Chu et al. |
| 8,225,102 B1 | 7/2012 | Palmer et al. |
| 8,225,391 B2 | 7/2012 | Labaton |
| 8,639,628 B2 | 1/2014 | Popp |
| 9,002,750 B1 | 4/2015 | Chu et al. |
| 2001/0054148 A1 | 12/2001 | Hoornaert et al. |
| 2001/0055388 A1 | 12/2001 | Kaliski, Jr. |
| 2002/0002678 A1 | 1/2002 | Chow et al. |
| 2002/0087860 A1 | 7/2002 | William Kravitz |
| 2002/0101988 A1* | 8/2002 | Jones ............... H04L 9/3228 380/54 |
| 2002/0103765 A1 | 8/2002 | Ohmori |
| 2002/0112156 A1 | 8/2002 | Gien et al. |
| 2002/0147930 A1 | 10/2002 | Pritchard et al. |
| 2002/0159601 A1 | 10/2002 | Bushmitch et al. |
| 2002/0166048 A1 | 11/2002 | Coulier |
| 2002/0178370 A1 | 11/2002 | Gurevich et al. |
| 2002/0198848 A1 | 12/2002 | Michener |
| 2003/0037262 A1 | 2/2003 | Hillhouse |
| 2003/0084304 A1 | 5/2003 | Hon et al. |
| 2003/0112972 A1 | 6/2003 | Hattick et al. |
| 2003/0115154 A1 | 6/2003 | Anderson et al. |
| 2003/0152254 A1 | 8/2003 | Ha et al. |
| 2003/0159068 A1 | 8/2003 | Halpin et al. |
| 2003/0163739 A1 | 8/2003 | Armington et al. |
| 2003/0172269 A1 | 9/2003 | Newcombe |
| 2003/0191949 A1 | 10/2003 | Odagawa |
| 2003/0204726 A1 | 10/2003 | Kefford |
| 2003/0208697 A1 | 11/2003 | Gardner |
| 2003/0212894 A1 | 11/2003 | Buck et al. |
| 2003/0217270 A1 | 11/2003 | Nakayama |
| 2004/0049685 A1 | 3/2004 | Jaloveczki |
| 2004/0059952 A1 | 3/2004 | Newport et al. |
| 2004/0083373 A1 | 4/2004 | Perkins et al. |
| 2004/0097217 A1 | 5/2004 | McClain |
| 2004/0103290 A1 | 5/2004 | Mankins |
| 2004/0111520 A1 | 6/2004 | Krantz et al. |
| 2004/0139028 A1 | 7/2004 | Fishman et al. |
| 2004/0153668 A1 | 8/2004 | Baier Saip et al. |
| 2004/0172531 A1 | 9/2004 | Little et al. |
| 2004/0230807 A1 | 11/2004 | Baird et al. |
| 2004/0243856 A1 | 12/2004 | Shatford |
| 2004/0255119 A1 | 12/2004 | Ukeda et al. |
| 2005/0015588 A1 | 1/2005 | Lin et al. |
| 2005/0050323 A1 | 3/2005 | Mizrah |
| 2005/0050330 A1 | 3/2005 | Agam et al. |
| 2005/0069137 A1 | 3/2005 | Landrock |
| 2005/0097320 A1 | 5/2005 | Golan et al. |
| 2005/0149762 A1 | 7/2005 | Smith et al. |
| 2005/0154923 A1 | 7/2005 | Lok et al. |
| 2005/0166263 A1 | 7/2005 | Nanopoulos et al. |
| 2005/0187873 A1 | 8/2005 | Labrou et al. |
| 2005/0188202 A1 | 8/2005 | Popp |
| 2005/0191992 A1 | 9/2005 | Inoue et al. |
| 2005/0193198 A1 | 9/2005 | Livowsky |
| 2005/0208891 A1 | 9/2005 | Khare et al. |
| 2005/0210252 A1 | 9/2005 | Freeman et al. |
| 2005/0273442 A1 | 12/2005 | Bennett et al. |
| 2006/0041759 A1 | 2/2006 | Kaliski et al. |
| 2006/0059344 A1 | 3/2006 | Mononen |
| 2006/0287963 A1 | 12/2006 | Steeves et al. |
| 2007/0050635 A1* | 3/2007 | Popp .................... H04L 9/0863 713/185 |
| 2007/0076866 A1 | 4/2007 | Vanstone et al. |
| 2007/0174630 A1 | 7/2007 | Shannon et al. |
| 2007/0180234 A1 | 8/2007 | Labaton |

FOREIGN PATENT DOCUMENTS

| | | |
|---|---|---|
| WO | WO-2005/025292 A2 | 3/2005 |
| WO | WO-2005/083610 A1 | 9/2005 |

* cited by examiner

METHODS AND SYSTEMS FOR SECURE USER AUTHENTICATION

CROSS-REFERENCE TO RELATED APPLICATIONS

This application is a continuation of U.S. patent application Ser. No. 17/845,954, filed Jun. 21, 2022, entitled "METHODS AND SYSTEMS FOR SECURE USER AUTHENTICATION," which is a continuation of U.S. patent application Ser. No. 15/677,894, filed Aug. 15, 2017, now U.S. Pat. No. 11,394,553, issued on Jul. 19, 2022, entitled "METHODS AND SYSTEMS FOR SECURE USER AUTHENTICATION," which is a continuation of U.S. patent application Ser. No. 13/019,333, filed Feb. 2, 2011, now U.S. Pat. No. 9,768,963, issued on Sep. 19, 2017, entitled "METHODS AND SYSTEMS FOR SECURE USER AUTHENTICATION," which is a continuation of U.S. patent application Ser. No. 11/789,054, filed Apr. 23, 2007, now U.S. Pat. No. 9,002,750, issued on Apr. 7, 2015, entitled "METHODS AND SYSTEMS FOR SECURE USER AUTHENTICATION," which is a continuation-in-part of U.S. patent application Ser. No. 11/636,839, filed on Dec. 11, 2006, now U.S. Pat. No. 7,904,946, issued on Mar. 8, 2011, entitled "METHODS AND SYSTEMS FOR SECURE USER AUTHENTICATION," which claims priority to U.S. Provisional Application No. 60/749,230 filed Dec. 9, 2005, entitled "METHODS AND SYSTEMS FOR SECURE USER AUTHENTICATION," and U.S. Provisional Application No. 60/784,970 filed Mar. 22, 2006, entitled "METHODS AND SYSTEMS FOR SECURE USER AUTHENTICATION," each of which is incorporated by reference herein.

FIELD OF THE INVENTION

The present invention relates generally to the field of secure user authentication, and more particularly to the secure use of one-time passwords (OTPs) for user authentication, for example, for mobile phone banking, online banking, and access to self-service financial transaction terminals, such as automated teller machines (ATMs), as well as a challenge-response validator to provide mutual authentication between a user and a web site, email or other channel of communication.

BACKGROUND OF THE INVENTION

A current approach to authenticating individuals to electronic services over remote channels utilizes the equivalent of what is commonly known as the password portion of a login password that changes for every access. This approach is known as a one-time password (OTP) solution. Current attempts to employ OTP solutions on mobile platforms, such as mobile phones, PDA's, and the like are plagued by inherent weaknesses to the operating environment. For example, currently offered OTP solutions enable unauthorized persons to download viruses, spyware, etc. to mobile platforms that potentially compromise the secrets that are utilized within the OTP in much the same way as they do on personal computers. There is a present need for an OTP solution that overcomes such weaknesses.

SUMMARY OF THE INVENTION

It is a feature and advantage of the present invention to provide methods and systems for secure user authentication using OTP generation and validation techniques in which the shared secret for generating the OTP is not stored in the user's mobile device but the shared secret for generating the OTP is instead dynamically synthesized based on a PIN that activates the OTP generation and the personalized OTP data.

It is a further feature and advantage of the present invention to provide methods and systems for secure user authentication using OTP generation and validation techniques in which the client software has no knowledge of what the correct PIN should be and the only way to learn whether or not an OTP is correct is to submit it during user login, such that limiting the number of failed login attempts before the account is locked assures failure of a brute-force attack via the online channel.

It is another feature and advantage of the present invention to provide methods and systems for secure user authentication using OTP generation and validation techniques in which brute-force attacks to uncover the correct PIN for generating the correct OTP offline will also fail even if a hacker steals the user's mobile device and extracts the data inside for offline hacking, because there is nothing on the client device that contains the PIN or that is encrypted by the PIN.

It is another feature and advantage of the present invention to provide methods and systems for secure user authentication using OTP generation and validation techniques in which OTP PIN change can be done completely on the server side, since there is no need for the client to know the PIN.

It is an additional feature and advantage of the present invention to provide methods and systems for secure user authentication using OTP generation and validation techniques, which can be implemented in software, for example, for mobile phones, PDAs, PCs or with custom hardware OTP tokens.

It is a still further feature and advantage of the present invention to provide methods and systems for secure user authentication using OTP generation and validation techniques to defeat threats of phishing email and spoofed web sites.

To achieve the stated and other features, advantages and objects, embodiments of the present invention employ computer hardware and software, including, without limitation, instructions embodied in program code encoded on machine readable medium, to provide methods and systems for secure user authentication using OTP generation and validation techniques in which the shared secret for generating the OTP is not stored in the user's mobile device but instead is dynamically synthesized based on a PIN that activates the OTP generation and the personalized OTP data. The client software has no knowledge of what the correct PIN should be and always generates a normal looking OTP based on whatever PIN is entered, and the only way to learn whether or not the OTP is correct is to submit it during user login, for example, to a financial institution web application such as online banking. By limiting the number of failed login attempts before the account is locked, brute-force attacks via the online channel will fail. Further, brute-force attacks to uncover the correct PIN for generating the correct OTP offline will also fail even if a hacker steals the user's mobile device and extracts the data inside for offline hacking, because there is nothing on the client device that contains the PIN or encrypted by the PIN.

The computer-implemented methods and systems for secure user authentication using a one-time password for embodiments of the invention propose, for example, pre-storing a one-time password application on a first computing device for generating a valid one-time password value for the user responsive to receiving entry of a valid PIN value of the user, no part of which valid PIN value is stored on the first computing device, and pre-storing the valid PIN value and personalized OTP data for the user on a back-end server. Upon receiving entry on the first computing device of a purported PIN value of the user, a purported shared secret is dynamically synthesized on the first computing device by the one-time password application based on the purported PIN value of the user, and a purported one-time password value is generated on the first computing device based on the purported shared secret used as one of the input parameters to an OTP algorithm. The present invention should work with any OTP algorithm that utilizes a shared secret. Thereafter, when entry of the purported one-time password value and the corresponding unique user ID are received by the back-end server in an attempt to log on the back-end server from a second computing device, the back-end server cryptographically calculates the shared secret based on the user's PIN stored in the back-end server's database to compute a window of OTPs using the OTP algorithm, and if the submitted OTP received from login matches one of the OTPs generated on the back-end server, the logon is allowed.

The one-time password application for embodiments of the invention can be stored, for example, on any type of computing device, including for example, a mobile phone, a PDA, a PC, a laptop computer, a hardware token, or an ATM. The one-time password application includes, for example, an algorithm that employs a moving factor for generating successive different valid one-time password values responsive to receiving entry of the valid PIN value of the user. In one embodiment, the moving factor employed by the algorithm on the first computing device utilizes an incrementing event counter that is synchronized with an incremental event counter on the back-end server. In another embodiment, the moving factor employed by the algorithm on the first computing device utilizes a clock that is synchronized with a clock on the back-end server.

In still another embodiment, the moving factor employed by the algorithm on the first computing device utilizes both an incrementing event counter that is synchronized with an incrementing event counter on the back-end server and a clock that is synchronized with a clock on the back-end server. In such embodiment, the algorithm on the first computing device employs both the incrementing event counter and the clock for generating successive different valid one-time passwords within successive moving time windows in response to receiving entry of the valid PIN of the user.

In embodiments of the invention, the valid PIN pre-stored for the user on the back-end server is created by the user in an interactive enrollment session between the user and the back-end server. Additionally, the user can change the user's PIN in a succeeding interactive session between the user and the back-end server.

As noted above, in embodiments of the invention, the purported PIN value entered on the first computing device is either the valid PIN value of the user or an invalid PIN value. In either case, the purported PIN value that is entered is employed as part of an algorithm process to dynamically synthesize the purported shared secret by the one-time password application, and the purported one-time password value is generated on the first computing device based on the purported shared secret regardless of whether the purported PIN value is the valid PIN value of the user or an invalid PIN value.

As also noted above, log on to the back-end server from the second computing device is allowed if the calculated purported OTP submitted for login matches an OTP in the window of OTP values generated by the back-end server, but log on is denied if the calculated purported OTP submitted for login fails to match any of the OTP values generated by the back-end server. In addition, further log on attempts are blocked after a predetermined number of denied attempts to log on to the back-end server.

In a web site authentication aspect of embodiments of the invention, pre-storing the one-time password application on the first computing device involves, for example, pre-storing a web site verifier function of the one-time password application on the first computing device for generating a valid random challenge code on the first computing device responsive to receiving entry of the valid PIN value on the first computing device. In the web site authentication aspect, pre-storing the valid PIN and the personalized OTP data for the user on the back-end server further involves pre-storing a web site verifier function for the user on the back-end server for generating a valid time-sensitive response code responsive to receiving entry of the valid random challenge code from the second computing device.

In the web site authentication aspect, upon receiving entry of the purported PIN value of the user and selection by the user of the web site verifier function on the first computing device, a valid random challenge code is generated for mutual authentication of a web site for the user by the web site verifier function on the first computing device of the user. The back-end server first checks to see if the "random" challenge code is valid before it produces a response. If the user does not enter the correct PIN during the challenge code generation phase on the first computing device, the "random" challenge code generated will be detected as invalid by the back-end server, and no response code will be returned. In addition, the invalid attempt count for the user will be incremented for each invalid challenge code received. If the number of invalid attempts exceeds a threshold, the user account will be blocked to prevent brute-force attacks. If the challenge code is valid, then the web site will consider the challenge to be legitimate. This is the first half of the mutual authentication. Thereafter, upon receiving entry of the valid challenge code by the back-end server from the second computing device, a time-sensitive response code is cryptographically calculated by the back-end server based on the challenge code, the knowledge of the user PIN, and the personalized OTP data stored in the back-end server database. The calculated time-sensitive response code is displayed for the user on the second computing device. When entry of the displayed response code is receiving on the first computing device, an affirmative indicator is displayed on the first computing device by the web-site verifier function on the first computing device if the entered response code corresponds to the generated challenge code. Otherwise, the website cannot be trusted. This completes the mutual authentication process between the user and the web site.

In an email authentication aspect of embodiments of the invention, pre-storing the one-time password application on the first computing device involves, for example, pre-storing an email verifier function of the one-time password application on the first computing device for generating a valid time-sensitive response code on the first computing device responsive to receiving entry of the valid PIN value and a valid challenge code associated with an email message received on a second computing device. The challenge code validity check will be performed in the first computing device before the response code generation. In the email authentication aspect, pre-storing the valid PIN and the personalized OTP data for the user on the back-end server further involves pre-storing an email verifier function on the back-end server for generating a valid time-sensitive response code responsive to receiving entry of the valid challenge code and the corresponding unique user ID from the second computing device. The challenge code validity check will be performed on the back-end server before the response code generation.

The email authentication aspect involves, for example, cryptographically calculating a challenge code by the back-end server based on the PIN and personalized OTP data for the user and providing the calculated challenge code for inclusion in an email for the user. Assuming the user receives the email with the challenge code and a URL link in the email to access a web site, he or she can simultaneously authenticate both the email and the web site by the following procedure: The user utilizes the email authentication function on the first computing device. Upon receiving entry on the first computing device of the purported PIN value and a selection by the user of the email verifier function and the challenge code associated with the email that was received on the second computing device, a response code for authenticating the email message for the user is generated by the email verifier function on the first computing device of the user. The user can then authenticate the email message by entering the same challenge code and his or her unique user ID on the web site referenced by the URL link in the email, and if the displayed response code from the web site corresponds to the response code generated on the first computing device, then the email and web site is authenticated.

Additional objects, advantages and novel features of the invention will be set forth in part in the description which follows, and in part will become more apparent to those skilled in the art upon examination of the following, or may be learned from practice of the invention.

DETAILED DESCRIPTION

Figure 1:
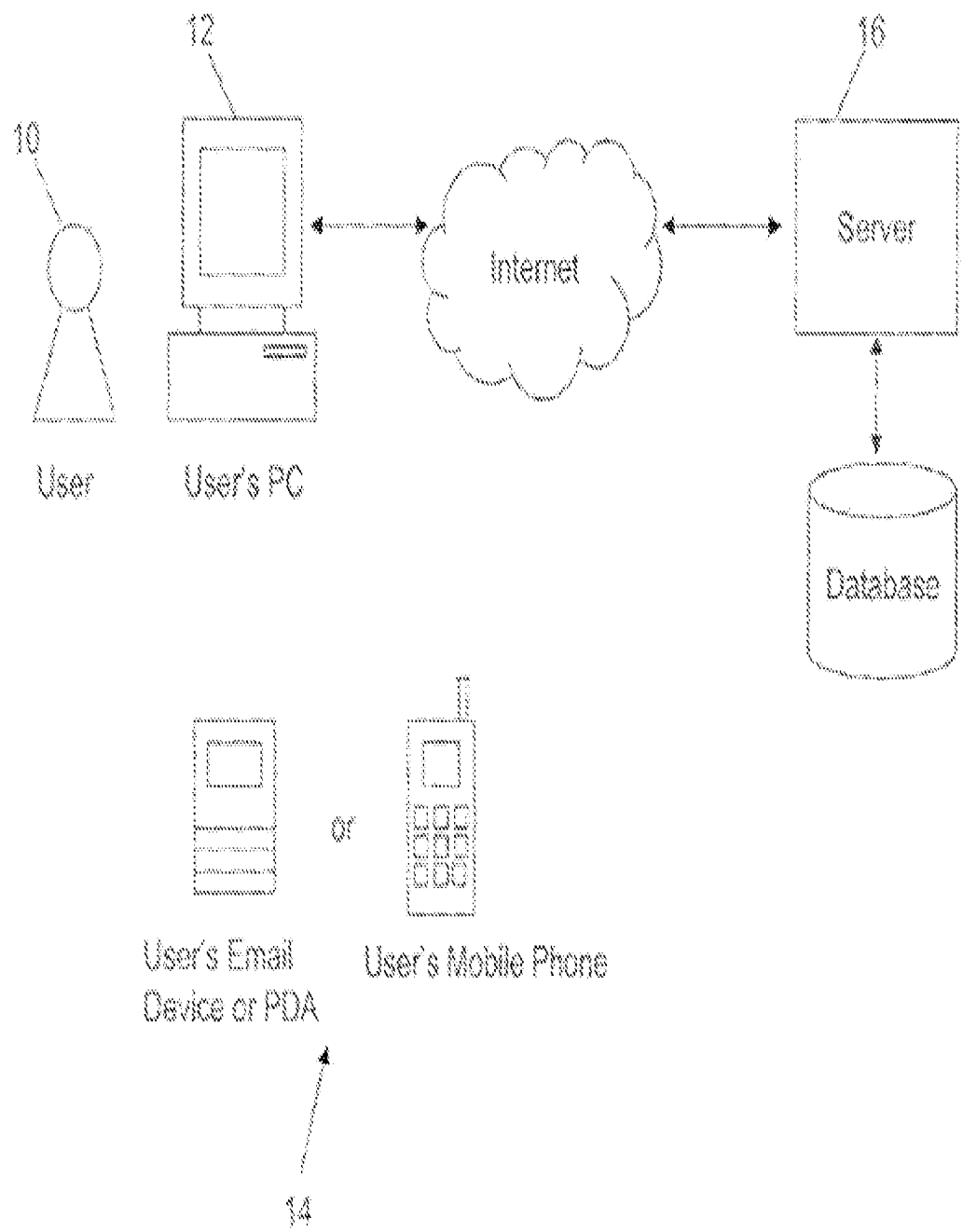
FIG. 1 is a schematic diagram that illustrates a high level overview of an example of key components and process flow for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Embodiments of the invention utilize an open standard for the OTP algorithm itself based, for example, on algorithms and standards such as those developed by the initiative for Open AuTHentication or OATH consortium. Unique aspects of embodiments of the invention add value, for example, via the manner in which secrets are distributed, identified and accessed within the actual operation of the solution. In other words, embodiments of the invention add value to the entire activation and usage process, which provides a level of security above and beyond that which would normally be available in existing mobile platforms.

A solution provided by embodiments of the invention uses a novel technique that eliminates the need to store a complete shared secret on a user's mobile device, such as a mobile phone, for the OTP generation. Instead, the shared secret is generated dynamically every time the user uses the OTP application on the mobile phone with some type of PIN, and the PIN combined with the personalized OTP data unique to every user is stored on the phone. Thus, in embodiments of the invention, the shared secret is generated based on PIN input and the personalized OTP data, so that the mobile phone itself does not know or need to know the correct PIN.

Accordingly, if an unauthorized person who does not know the user's PIN gains possession of the user's mobile phone and enters an incorrect PIN using a brute-force technique starting, for example, with 0000 or the like, each time that person enters such a PIN, he or she will get an OTP value but will not know whether or not the OTP is correct. It would be necessary for such an unauthorized person to actually enter that OTP and the corresponding unique user ID through some kind of login attempt, for example, to an online financial services application to actually find out whether or not that OTP is correct. Further, the financial institution providing the online financial services application has control on the server side over the number of unsuccessful login attempts a user is allowed to make. Thus, a brute-force technique would not work in trying to find a PIN or find a set secret for OTP generation according to embodiments of the invention.

For example, if three incorrect PINs are entered, the financial institution server identifies that and locks up the user's account. Specifically, assume, for example, that three successive incorrect PIN values are entered incorrectly into the OTP application on the user's mobile phone. Assume further that each time the mobile phone generates an OTP value it is in turn entered in an attempt to login to the online financial services application. The financial institution's server detects entry of the three successive incorrect OTP values and locks out the user's account until the user coordinates with customer service and identifies and proves his or her identity. It is to be understood, of course, that the number of times one can enter an incorrect OTP value before the account is locked is parameterized and configurable on the server side.

In embodiments of the invention, the OTP is generated on the user's device, such as the user's mobile phone, and thereafter the user enters that OTP into whatever device is employed in the channel by which the user accesses an application, such as a financial institution's application. The device can be, for example, a personal computer, a laptop computer, a PDA device, a handheld email device, a phone, an ATM, or the like. A key aspect of embodiments of the invention is that the mobile device does not contain the shared secret. Therefore, if an unauthorized person, for example, simply performs a memory dump on the user's mobile phone and replicates the mobile phone without knowledge of the user's PIN, the replicated mobile phone's OTP function is totally useless. While entry of an incorrect PIN on the mobile phone will generate an incorrect OTP value with the same format as a valid OTP value, the unauthorized person will not know whether or not the generated OTP value is incorrect until he or she attempts to use it to login to the financial institution application.

Many currently available commercial solutions have the complete shared secret encrypted and secret encryption PIN checksum on the user's mobile phone. In such solutions, a brute-force technique can be used by an unauthorized person to find the PIN that matches the checksum and enables such person to find and decrypt the encrypted secret in the phone for OTP generation. That is a serious weakness of such commercial solutions, which is eliminated by the unique approach of embodiments of the invention. Other currently available commercial solutions simply store the shared secret on the user's mobile phone. In such solutions, the shared secret may be encrypted, but it is typically encrypted with another key that is also stored on the user's phone. That is likewise a serious weakness, because if the phone is compromised, all of that information can be extracted by an unauthorized person who then has sufficient information to replicate the user's OTP environment. Yet another currently available solution utilizes self-destruction of shared secret in the OTP generation device after a few bad PIN entry attempts to prevent brute-force attack. However, if the attacker performed a memory dump of the device before the attack, the self-destructed shared secret can be restored from the memory dump for further brute-force attacks until the shared secret is found.

An important aspect of embodiments of the invention is implementation of a combined event-time windowing solution, as well as a number of other different counter options, within the OTP solution. The OATH algorithm itself primarily focuses on what is referred to as an event-based count or increment. There is a shared secret and a counter, and the counter increments and changes the OTP values that are being generated. In embodiments of the invention, the shared secret is a cryptogram or a key for a cryptographic calculation which is stored on the server side, but not on the client side. The shared secret on the client side is generated in the client for OTP generation when the user enters the correct PIN on the client side. Once the OTP generation is complete, the shared secret on the client side is destroyed. Thus, embodiments of the invention generate the shared secret in the client as opposed to simply decrypting the shared secret in the client.

In an implementation of embodiments of the invention, since the shared secret is a composite value, it is held on the server side and is generated on the client side by the value created during client side activation in conjunction with the PIN entered by the user when the client application is activated for OTP generation. On the other hand, the OATH algorithm has the shared secret on both the client and the server. The OATH algorithm has basically two components, one of which is a static component of the secret, which does not change. For example, in a hard token that uses the OATH algorithm, there is a static component, which is a very long key, such as 40 bytes, and a moving component, which is a counter. Embodiments of the invention differ from the OATH algorithm, for example, in respect to the moving part and the static part of the secrets in that those aspects are not simply stored on the user's mobile phone so that unauthorized persons can easily take the user's phone and duplicate it in order to compromise the user's OTP. As far as the OATH algorithm is concerned, the two inputs, i.e., the moving factor and the static factor, look the same and it does not matter where those inputs come from.

The PIN in an implementation of embodiments of the invention is managed on the server side. For example, when a bank customer registers for online banking services using the one-time password implementation for embodiments of the invention, the customer can create a PIN for that one-time value solution. Creation of such PIN is performed by the customer online interacting with the server. Thus, the server on the back-end knows the particular PIN value. Thereafter, when the customer downloads the software for embodiments of the invention to the customer's mobile phone and activates it and uses his or her PIN at that point in time, the PIN is used in creating the secret interactively, but the PIN value is not retained on the customer's phone. Instead, the PIN is retained only at the server, so the server knows that when it receives an OTP value in the password field, it can then validate the OTP value by comparing the OTP value to a window of OTP values generated by the server using the user shared secret and other OTP parameters stored in the server. This implementation utilizes what is referred to as a soft PIN approach, as opposed to the hard PIN approach in currently available solutions in which the PIN actually resides on the mobile device, which is a security risk.

Embodiments of the invention propose the one-time password solution for use as a secure user authentication mechanism, for example, for mobile phone banking, online Internet banking, and automatic transaction machines (ATM) access. As previously noted, embodiments of the invention employ a one-time password algorithm based, for example, at least in part on an open standard from IETF for one-time password generation and validation developed by the initiative for Open Authentication consortium (OATH). The utilization of an algorithm, such as the open standard one-time password algorithm, in a one-time password solution for embodiments of the invention has a number of advantages. Such advantages include, for example, an availability of OATH compliant tokens from multiple vendors, the ability for an entity to its own OATH-based OTP components on both the server and client sides which can eliminate a need for an OTP token, and the extendibility of the OATH OTP algorithm to support many one-time password variations if both the server and the client components are owned by the same entity, such as a financial institution.

The one-time password solution for embodiments of the invention can be implemented, for example, in Java mobile phone devices using a standard Java 2 Micro Edition (J2ME) MIDlet without requiring any server connection. In addition, one-time password validation can be implemented with standard Java technology on a server. In embodiments of the invention, the one-time password J2ME MIDlet is designed with high security and PIN protection features. The server OTP component is architected for easy integration with standard server components, procedures related to secure token/MIDlet distribution and management are addressed, and an unified interface for authentication services is also provided.

FIG. 1 is a schematic diagram that illustrates a high level overview of an example of key components and process flow for embodiments of the invention. Referring to FIG. 1, a user 10, such as a financial institution customer, accesses the user's account via a login screen on the user's computing device 12, such as a PC, which requires a one-time password in addition to the user's normal on-like banking credentials. The user uses his or her mobile telecommunications device 14, such as a phone, PDA, or handheld email device, and starts the one-time password (OTP) application for embodiments of the invention. The OTP mobile application in the mobile phone 14 is PIN protected. The user 10 enters his or her OTP PIN on the phone 14 to enable OTP generation, and an OTP is displayed on the mobile phone screen. The user 10 enters the OTP into the on-line banking login form in the PC 12 along with his normal on-line banking credentials. Upon receiving the user credentials and OTP from the on-line banking login form, the online banking login module in the server 16 authenticates the user 10, for example, by first validating the user's normal online banking credential. If the on-line banking credential validation is positive, the OTP is then validated using the OTP received and the user's unique customer ID as a key to locate the OTP shared secret for the user. If the OTP validation is also positive, the login is accepted and the user 10 is authenticated. Otherwise, a login-failed message is displayed.

The mobile client software for embodiments of the invention consists, for example, of a one-time password generator written in J2ME. The OTP algorithm is based, for example, at least in part on OATH Version 2. The OATH OTP generator takes three arguments to produce an OTP. The three arguments are:

d—the number of OTP output digits (minimum is 6, maximum is 10)

k—a 20-byte share secret c—an 8-byte counter Essentially, the OATH OTP algorithm first computes the HMAC-SHA1 value (see IETF RFC 2104) with the shared secret value as the HMAC-SHA1 key and the counter-value as the text input to HMAC-SHA1. It then applies a dynamic truncation algorithm to reduce the 20 bytes output of HMAC-SHA1 into a 31-bit number. The 31-bit number is then reduced to the number of OTP digits using modular arithmetic to form the final OTP value. Mathematically, it can be written as follows:

OTP (d, k, c)=Truncate (d, HMAC-SHA1 (k, c))

OTP algorithms can have a moving portion, which is event based and simply counting or incrementing, or that employs a clock that can be synchronized between the client device being used to generate the OTP value and the back-end server. In the latter case, the actual time value can be used as the moving factor in place of the event counter instead of a counter simply incrementing. Either the event-based aspect utilizing some type of counter or the time-based aspect can be used.

In the event-based aspect, the counter (or incrementor) increments every time a user requests a new OTP value. Thus, every time a user performs an OTP, the counter increments. An area of concern in the use of time synchronization with mobile devices is a lack of precision from one mobile device to another. In other words, if the clock on the user's mobile phone is not accurate, it may be unlikely that it is synchronized with (or within an acceptable window of tolerance) with the back-end server. Therefore, if time-based increments are used as the basis of creating randomness in OTP values, it may not be possible for the user's mobile phone to match up with what the server thinks is the time, so the OTP value would fail to validate. In other words, if the user's mobile phone is, for example, five minutes different from what the server thinks the time is, it may be outside the acceptable (i.e., recognizable) window of tolerance.

A consideration that may dictate a preference for utilizing a time-based value rather than an event-based value is that once an event is created, it is valid until used and the next event occurs. Accordingly, if an unauthorized person captures that event based OTP value, he or she can reuse it at some later point in time if the user does not make contact with the system. However, with a time-based value, there is a moving window on the back-end server as time progresses, so that when the user generates an OTP value based on a moving factor of time, it is only valid until the window moves beyond the particular time frame after which it automatically expires. This automatic aging that occurs when a time-based value is used makes the solution more secure.

While the OATH specification provides the formula for computing the OTP, it does not specify how to generate and/or distribute the shared secret and the initial counter value, which affords opportunities for creating various alternate OTP solutions that meet the needs of businesses, such as financial institution businesses. For example, the plain OATH algorithm is event-based only. However, a time-based OTP solution can be developed using the Universal Time Coordinate (UTC) as the counter value for embodiments of the invention. Further, the shared secret can be mixed with transaction data to develop e-Signature based OTP transactions for embodiments of the invention to defeat the man-in-the-middle attack. Embodiments of the invention enable many different variations for an entity, such as a financial institution, that has control over the OTP validation component on the server side.

Mobile client aspects of OTP generation for embodiments of the invention include, for example, a soft PIN event-based OTP generator aspect and a time-based OTP generator. The soft PIN event-based OTP generator aspect for embodiments of the invention likewise includes features, such as customer registration, personalization and initialization, normal operation, PIN change, and resynchronization. A significant feature of the soft PIN approach is the elimination of the need for keeping the shared secret in the user's mobile phone. However, in the soft PIN event-based OTP generator aspect for embodiments of the invention, the OTP server component must know the OTP PIN of the customer.

In a customer registration process of the soft PIN event-based aspect for embodiments of the invention, for example, an on-line banking customer can register to use his or her mobile phone as his or her OTP generator by visiting a 'Mobile Phone OTP' registration web page after signing on for on-line banking. The registration process first determines if the customer's mobile phone is a compatible Java phone by asking the customer, for example, to select the brand and model number of his mobile phone from a list of compatible Java phones and devices. If the customer selects a compatible mobile phone from the list, the registration process asks the customer to choose a PIN for generating an OTP and generates a personalized activation code for the customer. The customer will receive the activation code for activating the OTP generator application in the mobile phone via an alternative delivery channel (e.g. deliver to his email or home mailing address) for added security. An error check is performed to make sure the OTP PIN selected by the customer meets the OTP PIN format requirements, and at the end of the registration process, download instructions are provided to the customer. Since there is no need to personalize the mobile phone OTP application, the financial institution's on-line banking functionality can direct the customer to download a mobile phone OTP generator application, for example, from a file download page over the web. Alternative mobile phone application downloads, such as over the air (OTA) push or the like, can likewise be implemented.

In a personalization and initialization process of the soft PIN event-based aspect for embodiments of the invention, for example, the customer is given an activation code after registration via an alternative delivery channel such as email or physical mail. This activation code is a random number generated by the OTP server component for randomizing the initial counter for the mobile phone OTP generator and to uniquely identify the user. There is no shared secret to store in the mobile phone. When the customer uses his or her OTP mobile application for the first time, the customer must enter the activation code. The OTP mobile application uses the activation code, for example, to generate an initial 64-bit counter for the customer and a 96-bit PIN extension code for randomizing the PIN value. The counter and the PIN extension code are then stored in a file on the mobile phone, and both entries can be encrypted with a unique phone dependent ID, such as an IMEI value for GSM phones and ESN for CDMA phones, if available.

In a normal operation process of the soft PIN event-based aspect for embodiments of the invention, for example, during a normal OTP session, the customer starts up the OTP application, and the OTP application displays its main screen with options such as 'Get OTP', 'Reactivate', and 'Exit' that map to the soft buttons on the mobile phone. When the customer presses the soft button corresponding to 'Get OTP', the OTP application asks the user to enter his or her PIN. As an illustration on how to apply the dynamic shared secret synthesis process of the soft PIN event-based aspect for embodiments of invention in the OATH OTP algorithm; the SHA-1 value of the (PIN 1 decrypted PIN extension code) is used as the shared secret component for the OTP algorithm, and the decrypted counter is used as a second argument for OTP generation. The OTP generator performs the OTP generation and an OTP is displayed on the main screen. It is to be understood that the OTP generator always generates an OTP whether or not the customer enters the correct PIN, which prevents brute force attacks from guessing the OTP PIN without going through the server. Once an OTP is generated, the OTP generator updates its counter and encrypts it with the phone dependent unique ID, and the resulting encrypted counter is used to replace the previously encrypted counter entry in the persistence memory of the OTP generation device.

In a PIN change process of the soft PIN event-based aspect for embodiments of the invention, for example, the customer can change his or her PIN by logging in to the financial institution's on-line banking web site and navigating to an OTP PIN change request web page. When the customer is on the OTP PIN request page, the user must to enter his or her old OTP PIN and his or her new OTP PIN. To assure that the customer entered the new PIN correctly, the OTP PIN change process transitions to a new PIN confirmation screen and asks for the new PIN again. After confirming that the new PIN satisfies OTP PIN rules, such as minimum length, format composition, or the like, the OTP PIN change is complete. It is not necessary for the customer's mobile phone to be involved in the PIN change.

A resynchronization process of the soft PIN event-based aspect for embodiments of the invention is for customers who may have pushed the OTP generation buttons too many times resulting in getting out of sync with the OTP server. When a customer has trouble with his on-line banking OTP logon, he or she can call on-line banking support, in which case, support personnel validate the identity of the customer and then request the customer to generate a predetermined number (M) of one-time passwords using his or her mobile phone OTP application. The number (M) of one-time passwords requested, for example, is a parameter in the OATH OTP server side setup, and two to three one-time passwords is usually sufficient for resynchronization. When the support personnel initiate a resynchronization request by entering the one-time passwords of the customer in sequence, the OTP server application retrieves the customer's existing OTP parameters, such as a shared secret, current counter, or the like, and generates the next few numbers of one-time passwords for the customer.

In the resynchronization process of the soft PIN event-based aspect for embodiments of the invention, if the sequence of M number of one-time passwords matches the generated OTP sequence, the server updates its counter for the customer. Otherwise, the server generates the next one-time password and performs a sliding window match of the next sequence of M number of one-time passwords. This process iterates until a fixed number of one-time passwords has been tried without finding a match. The fixed number is also a parameter for the OATH OTP server application. If resynchronization fails, the customer is instructed to select a new PIN in the on-line banking OTP PIN change web site and attempt to resynchronization again. If the failure is repeated, the customer is furnished a new activation code by the support personnel to replace the customer's old activation code, in which case, the customer simply presses the "Reactivate" soft button on his or her mobile phone and enters the new activation code, and the OTP generator should now be synchronized with the OTP server component.

In the soft PIN event-based aspect for embodiments of the invention, the method for OATH counter update is incremented by one. However, in embodiments of the invention, the counter update method can be modified by hashing. For example, a SHA-1 hash of the counter can be performed every time the counter requires updating and the output used as the next counter value. This procedure is an example of a way to avoid encrypting the counter in mobile phones that do not support programmatic access to a phone-dependent unique ID or that do not have a phone dependent unique ID.

The time-based OTP generation aspect for embodiments of the invention represents a change from the event-based OTP aspects in which, for example, a time-based value, such as the universal time coordinate (UTC), is substituted for the counter in the OTP generation process, which can eliminate the counter component stored on the mobile phone. For example, if the soft PIN approach is taken, both the counter and the PIN extension code components on the mobile phone are eliminated. Since there are no persistent variables that must be saved on the mobile phone, it is not even necessary to sign the Java MIDlet. In the time-based OTP generation aspect, resynchronization can be done self-service by the customer by adjusting the clock of the mobile phone to match the OTP server's time. For example, the customer can set up his mobile phone to automatically sync time with its provider. There is no activation code to enter, and no personalized mobile application to download. Thus, the time-based OTP generation aspect for embodiments of the invention can be a very inexpensive and relatively maintenance free solution if, for example, the customer's mobile phone keeps accurate time relative to the OTP server by requiring the customer to set his or her mobile phone to time sync with the mobile carrier's time and users are willing to select an OTP PIN of reasonable length.

If a phone-dependent unique ID is accessible on a user's mobile phone and the user can provide that unique ID value during registration, the unique ID can be mixed with the UTC to make the time-based OTP generation aspect for embodiments of the invention even more secure. Otherwise, a server generated activation code can be used to randomize the PIN extension code and counter components can be used similar to the method described hereinabove with respect to the normal operation process of the soft PIN event-based aspect for embodiments of the invention. In this case, the counter is time sensitive (initial random counter+UTC).

On the server side for embodiments of the invention, for example, a JAAS pluggable authentication module (PAM) for OTP validation is utilized for integration with the financial institution's on-line banking application. During the login integration, for example, an on-line banking login module is executed first, and if the result is good, the process continues with the OTP login module. If both login modules return true, the customer is authenticated and control is returned to the on-line banking application. Otherwise, a login error message is displayed and the customer can retry the login. On the user interface for login, a field is employed to collect the OTP value. On the on-line banking customer side, depending on which client OTP generator aspect for embodiments of the invention is employed, web pages are provided, for example, for OTP customer registration, for OTP PIN change, and for downloading the mobile phone application. On the support personnel side, for example, a web page is provided for support functions, such as resynchronization and re-activation. Finally, a core library of functions, for example, for OTP validation, registration, and management is provided.

In order to take advantage of the use of time-based values in this environment in which there are unknown differences between the client side device and the server with which the user attempts to communicate, an aspect of embodiments of the invention makes the time window greater but also incorporates an event-based component. Thus, while the server side window is much larger, because both factors are utilized, a user has a great deal of flexibility in using the system. In other words, a situation can arise if there is a large time step and no event counter in which virtually every time the user presses the key on the client device to create a new OTP value, he or she can end up with the same value because the time window has not changed. However, this situation cannot arise when both factors are used in the solution for embodiments of the invention.

According to embodiments of the invention, instead of being purely time based or purely event based, the moving factor is both time and event based. Thus, if the time increment is 30 minutes, between, for example, 1:00 PM and 1:30 PM according to the clock on the user's mobile phone, the value of 1:00 PM will be used for all OTP values generated. Thereafter, for example, at 1:30 PM, the user's mobile phone increments and begins using 1:30 PM for generation of OTP values. However, if the user performs, for example, a couple of transactions between 1:00 PM and 1:30 PM, once the user uses an OTP value, the next value will be different because the event counter changes even though the time window has not expired.

In implementations of the invention utilizing the time and event-based combination, every time the user asks for an OTP value, the counter also increments, so when the user asks, for example, for an OTP at 1:00 PM and the counter is five, an embodiment of the invention takes 1:00 PM and five as the moving factors and creates an OTP value. Thereafter, if the user asks for another OTP value at 1:02 PM, the embodiment again takes 1:00 PM, but the counter is six, so it creates an OTP value based on that moving factor value which is different. Thus, embodiments of the invention provide the ability to control expiry of outstanding OTP's but in a manner in which the greater variability of the various clocks is accommodated.

Two significant aspects of implementations of embodiments of the invention involve, on the one hand, providing greater security to the solution by removing the essential secret for OTP generation from the client platform and on the other hand, addressing concerns about time variability on mobile platforms by providing an implementation that combines the event and time characteristics of the moving component of the solution. In the first aspect the OTP shared secret is not stored on the client side but only on the server, which cannot be done by currently available solutions. Further, in implementations of the invention, the PIN itself is used as part of the algorithm process, while currently available solutions use the PIN simply to unlock an application or actually use the PIN internally, for example, to decrypt the secret that is stored in the phone. As previously noted, an unauthorized person can take a user's mobile phone and decrypt it with a brute-force technique because all the information needed is stored on the phone including the checksum to verify whether the PIN is correct.

As also previously noted, a unique feature of embodiments of the invention is that there is nothing to enter to decrypt on the client side. An unauthorized user can enter anything as a PIN and an OTP will be generated, but he or she cannot know if it is a valid or invalid OTP. Another unique feature is that embodiments of the invention provide a solution to the clock synchronization issues on most mobile phones.

Another disadvantage of currently available time-based commercial solutions is that an unauthorized person in possession of a user's mobile phone can adjust the time, such as setting it to the next day at the same time, and then generate an OTP, copy it down, and reset the mobile phone back to the current time so that the user does not notice. Thus, the unauthorized user has a time window in the next day to use that OTP to login to the user's account without alerting the user because it is all time based and the clock is not locked and can easily be adjusted. However, because embodiments of the invention utilize a combination of both event and time, even if an unauthorized person changes the clock, the event is different (i.e., when an OTP is generated, the event counter increases) so when an OTP is requested at a later time, since the event counter changes, the OTP is different. Thus, it is useless for an unauthorized person to attempt to adjust the clock.

While the open standard OATH HOTP algorithm used to generate one-time passwords supports OTP generation and validation techniques, such as pure event-based OTP, pure time-based OTP, and event-plus-time-based OTP by manipulating the inputs to the standard OATH HOTP algorithm, a unique feature of the OTP solution for embodiments of the invention is that the shared secret needed to generate the OTP is not stored in the user's device running the OTP generating application. Instead the shared secret for generating the OTP is dynamically synthesized based on a PIN that activates the OTP generation and the personalized OTP data.

The OTP client software for embodiments of the invention has no knowledge of what the correct PIN should be and always generates a normal looking OTP based on whatever PIN is entered. The only way to determine whether or not the OTP is correct is to submit it during user login to a web application such as an online banking application. Since only a few failed login attempts are typically allowed before the account is locked, brute-force attacks via the online channel will fail. In addition, brute-force attacks to uncover a correct PIN for generating the correct OTP offline will also fail, even if an unauthorized person, such as a hacker, steals a customer's device running the OTP generating application for embodiments of the invention and is able to extract the data inside the device for offline hacking because there is nothing on the OTP client for embodiments of the invention that contains any information to indicate the correct PIN.

Since the OTP client for embodiments of the invention does not need to know the correct PIN, OTP PIN change can be accomplished completely on the financial institution server side, and it also simplifies customer support if the user forgets his or her OTP PIN. The process becomes the same as a static password reset. If a user forgets his or her PIN and is able to authenticate himself or herself to a customer service representative (CSR), the CSR can reset the customer's PIN to something such as the last four digits of the customer's social security number, and the user can then login and change the PIN to whatever he or she prefers.

The OTP solution for embodiments of the invention can be implemented in software, for example, for mobile phones, PDAs, PCs and the like or it can be implemented in alternative embodiments with custom hardware OTP tokens. The implementation is generic so that the same OTP application can be installed in various devices. The personalization of the OTP token for embodiments of the invention occurs when the user activates the OTP application by entering an activation code supplied by the financial institution, for example, via an alternate channel after the user registration phase. The personalized data can remain on the device or can reside, for example, externally on removable media.

Figure 2:
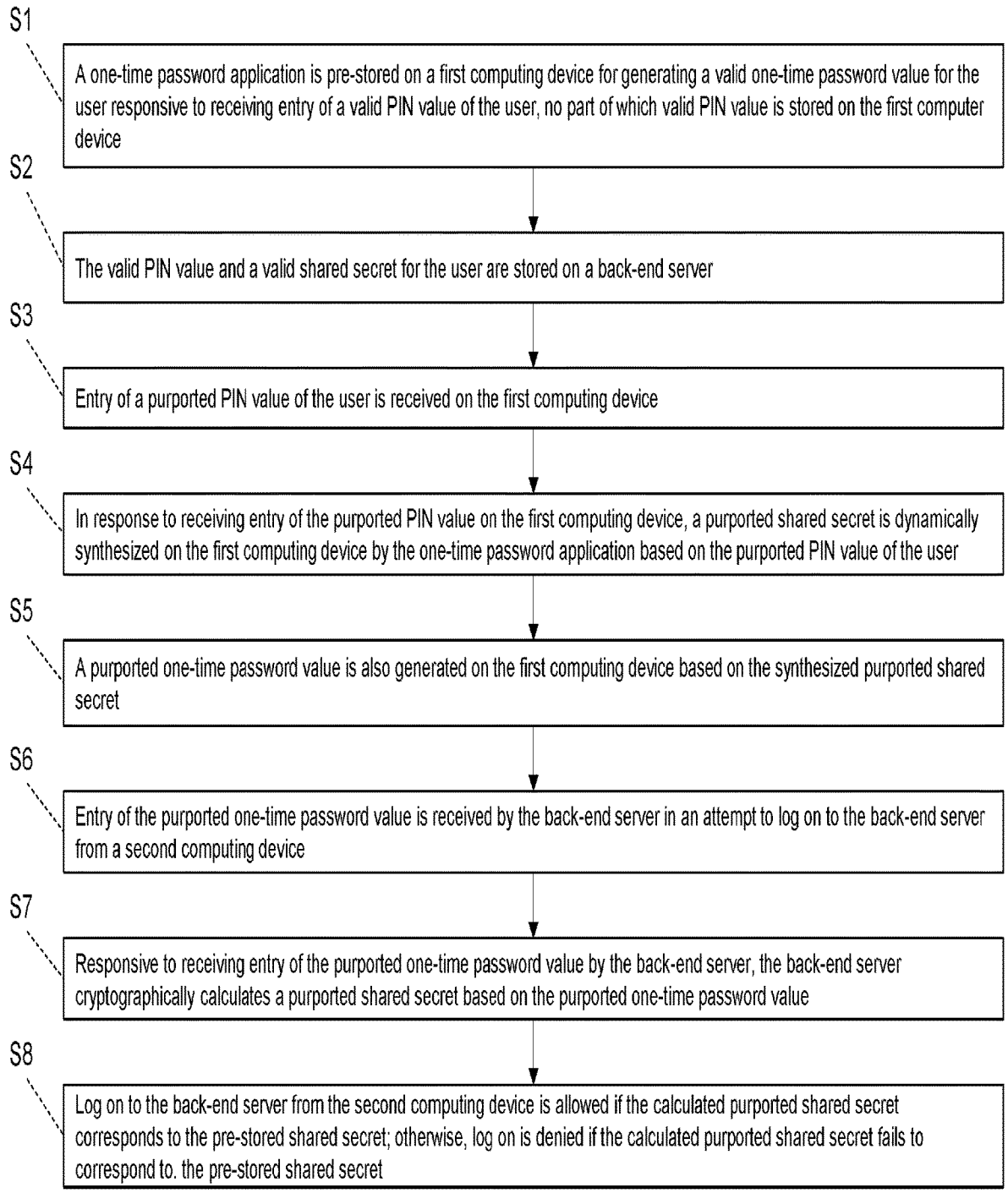
FIG. 2 is a flow chart that illustrates an example of the process of secure user authentication with a one-time password for embodiments of the invention.

FIG. 2 is a flow chart that illustrates an example of the process of secure user authentication with a one-time password for embodiments of the invention. Referring to FIG. 2, at 51, a one-time password application is pre-stored on a first computing device, such as the user's handheld email device, PDA, or mobile phone 14, for generating a valid one-time password value for the user 10 responsive to receiving entry of a valid PIN value of the user, no part of which valid PIN value is stored on the first computing device. At S2, the valid PIN value and a valid shared secret for the user are stored on a back-end server 16. At S3, entry of a purported PIN value of the user 10 is received on the first computing device 14, in response to which, at S4, a purported shared secret is dynamically synthesized on the first computing device 14 by the one-time password application based on the purported PIN value of the user. At S5, a purported one-time password value is generated on the first computing device 14 based on the purported shared secret. Thereafter, at S6, entry of the purported onetime password value is received by the back-end server 16 in an attempt to logon to the back-end server from a second computing device, such as the user's PC 12, responsive to which, at S7, the back-end server 16 cryptographically calculates a window of OTP values to match the purported one-time password value. At S8, logon to the back-end server 16 from the second computing device 12 is allowed if the received OTP value corresponds to one of the OTP values in the window. On the other hand, if the OTP value fails to correspond to any of the OTP values in the window, the logon is denied.

An additional aspect of embodiments of the invention includes anti-phishing, which is also a method that can be used to support mutual authentication, and which adds, for example, a "Web Site Verifier" function to the OTP client application on the mobile phone and a "Challenge Web Site" button to the login page that will allow the customer to check if the server is genuine before entering his or her OTP. Thus, a spoofed web site from a phishing scam will not be able to obtain a user's OTP without answering the challenge correctly. In the anti-phishing aspect, the web site verifier function uses a challenge-response technique to authenticate the web site, with the customer device generating a challenge and the web server producing a response to prove that it knows the customer's OTP shared secret. In order to safeguard the shared secret from reverse engineering, the technique used for generating the response is a time-sensitive truncated one-way hash function.

In the anti-phishing aspect of embodiments of the invention, whenever the user is not sure if the web site is genuine, the user can enter only his login ID and click on the "Challenge Web Site" button at the login page, and the web site presents a screen/pop up box that allows the user to enter a challenge code generated by his OTP token's "Web Site Verifier". The user uses his mobile phone to select the "Web Site Verifier" function in his OTP client application to generate a challenge code. In order to avoid replay attacks, for example, a moving factor sensitive pseudo-random number is generated by the "Web Site Verifier" function of the OTP client software as the challenge code. To avoid brute-force attack on the web server to find the user's PIN, the challenge code also carries information that the server can use to validate that it came from the user. The user enters the generated challenge code from his mobile phone OTP client software into the web site's challenge field and clicks "Submit Challenge", and the Web site displays a response code corresponding to the submitted challenge if the challenge code is valid. Otherwise, the server will return an invalid challenge code error. If the number of invalid challenge code entries exceeded a certain threshold, the user's account is locked to prevent brute-force attacks. If the server returns a response code, the user will enter the response code from the web server into his mobile phone's "Web Site Verifier", and the "Web Site Verifier" function on the mobile phone OTP client software returns a "Yes/No" answer to let the user know if the web site is genuine or not.

In the anti-phishing aspect, the "Challenge Web Site" button can be placed on other web pages after the initial login page to allow the user to challenge the web site at anytime. This is useful, for example, for a user who does not perform the challenge during login and later decides to check before performing a sensitive transaction such as external money transfer. This is also useful, for example, if the user receives an update code from the web site during a session (see, e.g., discussion of the policy driven OTP aspect below for how the update code works) and wishes to make sure the web site is genuine before entering the update code to his OTP device. A feature of the anti-phishing aspect is, for example, combined usage for mutual authentication in which, with the web site verifier, the user can authenticate the web site before giving out any sensitive data such as an OTP that is susceptible to phishing attack if the OTP algorithm is pure event-based. On the other hand, the web site can authenticate the user based on the user's OTP. In this way, two-way/mutual authentication can be achieved.

Figure 3:
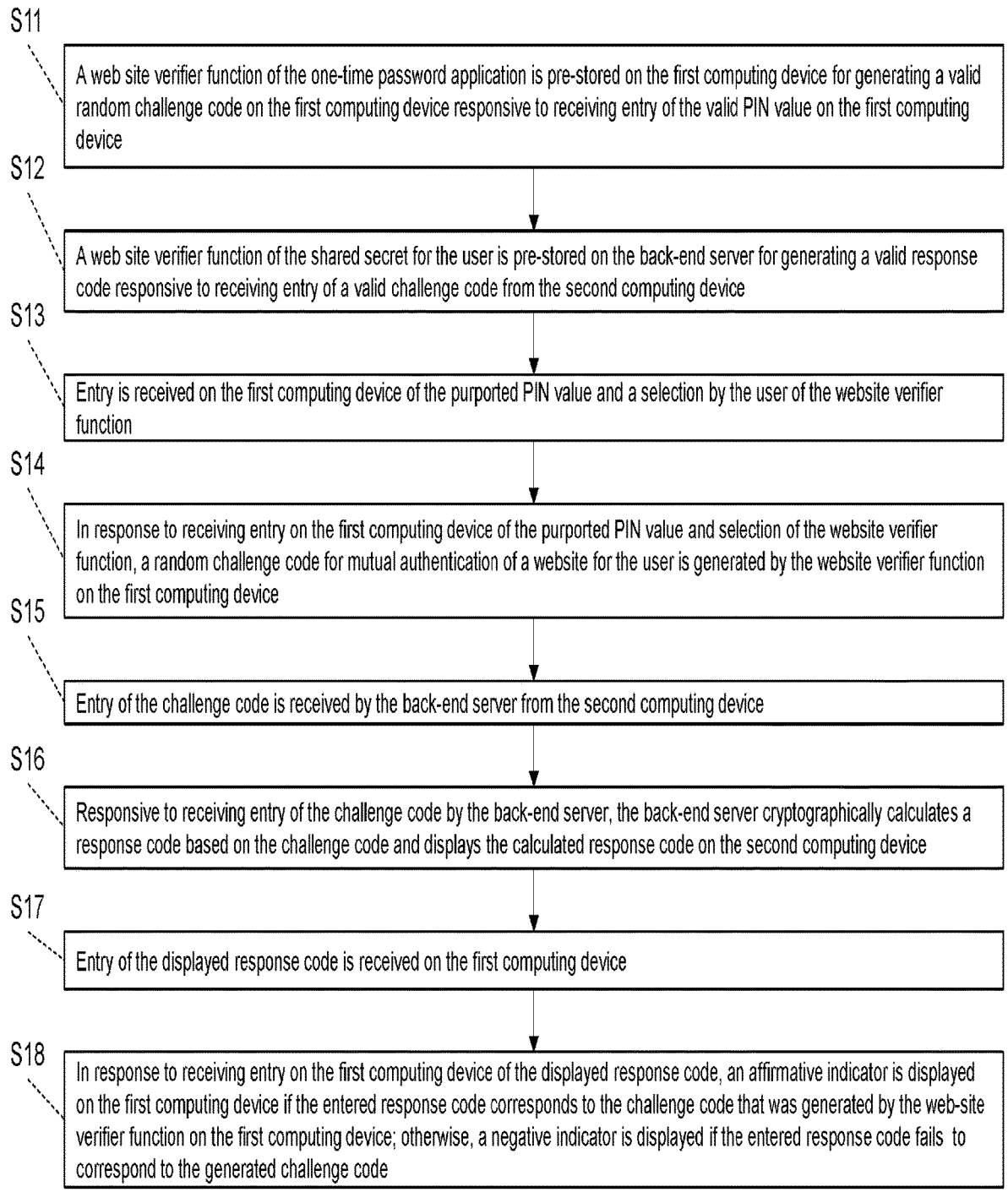
FIG. 3 is a flow chart that illustrates an example of the process of web site authentication for embodiments of the invention.

FIG. 3 is a flow chart that illustrates an example of the process of web site verification for embodiments of the invention. Referring to FIG. 3, at S11, a web site verifier function of the one-time password application is pre-stored on the first computing device, such as the user's handheld email device, PDA, or mobile phone 14, for generating a valid random challenge code on the first computing device responsive to receiving entry of the valid PIN value on the first computing device. At S12, a web site verifier function of the shared secret for the user is pre-stored on the back-end server 16 for generating a valid response code responsive to receiving entry of a valid challenge code from a second computing device, such as the user's PC 12. At S13, entry of a purported PIN value and a selection by the user 10 of the web site verifier function are received on the first computing device 14, in response to which, at S14, a random challenge code for mutual authentication of a web site for the user 10 is generated by the challenge web site function on the first computing device 14 of the user. At S15, entry of the challenge code is received and validated by the back-end server 16 from the second computing device 12, responsive to which, at S16, the back-end server 16 cryptographically calculates a response code based on the challenge code and displays the calculated response code on the second computing device 12. At S16, entry of the displayed response code is received on the first computing device 14, in response to which, at S17, an affirmative indicator is displayed on the first computing device 14, if the entered response code corresponds to the generated challenge code by the web-site verifier function on the first computing device 14. Otherwise, a negative indicator is displayed on the first computing device 14 if the entered response code fails to correspond to the generated challenge code.

Another aspect of the invention utilizes embodiments of the invention for defeating phishing email, which involves, for example, generating a one-time code using the knowledge of the user's OTP shared secret in the OTP server and including that one-time code in all legitimate email communications from the financial institution to its customers with the financial institution's mobile OTP. In the anti-phishing email aspect, a customer who receives an email from the financial institution can enter that code into the mobile OTP application to verify that the email came from the financial institution. Since the phishing email attackers do not know the shared secret of the user, they cannot generate the correct code to fake a financial institution email.

Figure 4:
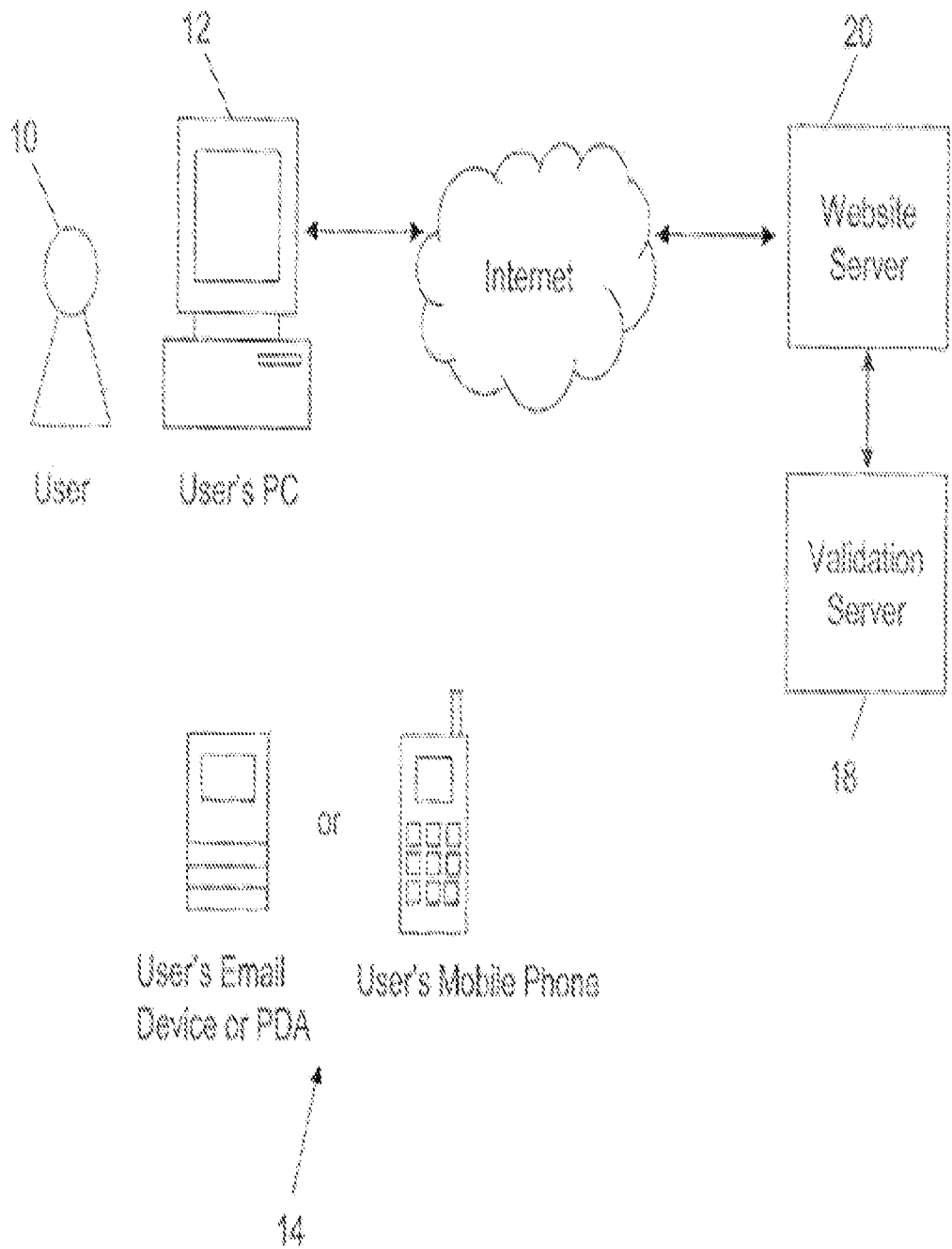
FIG. 4 is a schematic diagram that illustrates an overview example of the key components and the flow of information between key components in the anti-phishing aspect for embodiments of the invention.

FIG. 4 is a schematic diagram that illustrates an overview example of the key components and the flow of information between key components in the anti-phishing aspect for embodiments of the invention. To counter token theft and brute-force attacks, the OTP application resident on the user's device 14 does not have any knowledge of the correct OTP token PIN, which is a significant ingredient for dynamically composing the shared secret needed to generate the correct OTP. The OTP application on the user's device 14 generates an OTP no matter what PIN was entered, and only the OTP validation server 18 knows whether or not the generated OTP is correct. The validation mechanism for embodiments of the invention provides complete control on how many bad attempts are allowed on the server side before the financial institution blocks access to the user's account.

The anti-phishing email aspect of embodiments of the invention uses an arbitrary challenge code generated for every email that a financial institution sends out to its clients. This challenge code, also referred to as an e-code, can be highlighted with bold font or embedded in graphics or presented in some other fashion designed to catch the user's attention when it is included in the email. Inside the email there is, for example, a URL link that is personalized for the particular user, so if the user likes the email contents and is interested in the promotion, the user can click on the URL link and go to a web site 20.

The e-code that is included in the email can be used with the OTP token previously described herein. The user 10 can enter the e-code as a challenge, and a response, also referred as an e-response code, is generated off-line completely on the user's mobile device 14. When the user 10 clicks on the URL link in the email, the user goes to the web site 20, and the web site displays a response code. If the response code displayed on the web site 20 matches the e-response code generated by the user's OTP device 14, then the user 10 knows the web site is good. Otherwise, it is probably a spoofed web site.

Assume that an unauthorized third party intercepts the user's email and goes to the web site first and gets the response code and replays it in a spoofed site. An embodiment of the invention employs a time-based challenge-response algorithm so that the response code is different, for example, every "x" minutes. For instance, if the time "x" is set to 60 minutes or 60 seconds, the response code changes every hour or every minute. So, assuming the time "x" is set to 60 minutes, if an unauthorized third party harvests a response code, the e-response code changes after an hour and defeats the spoofed site thereafter.

The time-based challenge-response algorithm for embodiments of the invention eliminates 90% of such attacks. However, there is still a possibility that someone could try to defeat the time-based challenge-response mechanism by setting up an automated proxy-type spoofed web site by which whatever the authentic web site presents is simply projected to the user for the user to see. Thus, when the user enters the challenge code, it is simply forwarded to the authentic site, and the authentic site would generally respond.

In order to defeat such an automated proxy type spoofed web site, when the e-response code is presented, embodiments of the invention place the e-response code in some type of a Java display-rendering applet that is very difficult for an unauthorized party to cause to be automatically harvested and re-displayed in a spoof site. In other words, it becomes virtually impossible for the unauthorized party in real time to simply take the output and play it back in the spoof site to fool the user. Thus, according to the anti-phishing email aspect of the invention, when the user 10 receives the correct response, he or she can have a high level of confidence that the web site 20 is real and that he or she can proceed to login safely.

On the other hand, if the user still has doubts about the authenticity of the web site, the anti-phishing email aspect for embodiments of the invention employs another mechanism previously described herein. This mechanism is the challenge-the-web site function using a random challenge code as described previously herein, also referred to as a w-code. The OTP token for embodiments of the invention has another function for the challenge-the-web site type mutual authentication. Thus, the user selects the challenge-the-web site function and generates a challenge code. The financial institution's web site has a challenge-the-web site button on which the user clicks and transitions to a webpage that allows the user to enter the challenge code known as the w-code. The user then clicks on "submit" and receives a response. If the response matches the challenge-the-web site response generated by the user's OTP device, the user knows that the web site is authentic. The user can use this mechanism at any time during the session to prevent an unauthorized party's attempt to hijack the user's session.

Turning again to the verify function for the anti-phishing email aspect of embodiments of the invention, when the user 10 clicks on the link in the email, it is not necessary for the user to enter a user ID because the link in the email is personalized for the user. In other words, the link itself has parameters that contain both the e-code and, for example, a hash of the user ID or something that uniquely identifies the user 10 to the financial institution. The financial institution knows what the user's e-code is and generates a corresponding response. The user 10 sees the e-code in the email and enters the e-code into the user's OTP token 14 and generates a response. If that response matches the one displayed to the user 10 on the web site 20, then the web site is authentic. That is true even if a pass-through proxy-type attack is used, because when the financial institution presents its response to the user 10, it is displayed using technology employed to make it extremely difficult for someone to harvest the e-response code and replay it back to the user. For added security, the financial institution may require the user to enter his user ID as added evidence that the challenge came from the legitimate user.

Turning again to the challenge function for the anti-phishing email aspect of embodiments of the invention, as previously described herein, when a user 10 uses his or her OTP token 14 to connect directly to his or her financial institution web site 20 (as opposed to checking on email), the user normally enters his or her user ID and then clicks on the challenge-the-web site function and verifies that the site is authentic before entering his or her one-time password. Thus, the challenge-response algorithm for embodiments of the invention deployed in the user's OTP token 14 allows the user 10 to perform a two-way user authentication. Not only does the web site 20 verify that the user 10 is authentic, but the user also verifies that the web site is authentic before he or she proceeds with entering anything. Further, as previously discussed, the complete OTP shared secret is only on the server side. When the user generates a challenge and response, he or she must still enter his or her PIN to generate the OTP shared secret on the fly and generate the correct response.

In the anti-spoofed site validation aspect for embodiments of the invention, a user can avoid giving out any one-time password (OTP) to a spoofed site by using challenge and response spoofed site validator for embodiments of the invention. This protection is especially useful for event-based OTP solutions where the OTP can be captured by a spoofed site and used later before the user accesses the authentic web site. This validation mechanism can be used by the user to ensure that he or she is connecting, for example, to his or her financial institution's authentic web site at any point in a user session to counter session hi-jacking. The challenge and response spoofed site validator mechanism provides a mutual authentication for the user to challenge the web site at anytime just as the financial institution can challenge the user when he or she attempts to perform high risk or high value transactions. The displayed response to the challenge from the financial institution's web site uses an anti-scraping technique similar to those used in virtual keyboard against sniffers and Trojans to avoid a phishing-site-in-the-middle attack.

Referring again to FIG. 4, in the anti-spoofed site validation process for embodiments of the invention, a user 10 enters his or her user ID and clicks on a "Check Web Site" button in the login page displayed on his or her PC 12 by the web site server 20, uses the web site verifier application on the user's device 14 to generate a random challenge code, and enters it into a text box labeled "Please Enter Challenge" on the login page. The user 10 clicks on a "Submit Challenge" button and receives a response on the login page displayed on his or her PC 12 using an anti-scraping technique. The user 10 compares the response displayed on the login page displayed on his or her PC 12 by the web site server 20 with the response generated by web site verifier application in his device 14. If they match, the user 10 is assured that the web site 20 is authentic, and the user can proceed to perform his or her normal OTP login. This "Check Web Site" capability is accessible at any time during the user session, even after user login.

Current anti-phishing email protection schemes are static and susceptible to replay attacks as well as content and URL links substitution. The OTP anti-phishing email protection aspect of embodiments of the invention utilizes a time-based challenge/response mechanism to prevent such attacks. The time-based challenge/response algorithm prevents hackers from intercepting a user's email and harvesting the response from the authentic financial institution site and spoofing as the financial institution at a later time. This is effective because the response changes with time on the same challenge. The displayed response from the financial institution web site uses an anti-scraping technique similar to those used in virtual keyboard against sniffers and Trojans to avoid the phishing-site-in-the-middle attack.

In the OTP anti-phishing email protection aspect of embodiments of the invention, the financial institution generates a random challenge code and puts the code on a promotion email for a user. If the user is interested in the deal on the email, he or she clicks on the URL. Since the URL contains parameters with the challenge code and unique user data, an authentic URL will be able to generate a good response for the challenge and display to the user. The user verifies that the email came from the financial institution and that he or she has arrived at an authentic financial institution web site by entering the challenge code in the OTP generator application on the user's device to get a response code. If the response code matches, the web site is authentic and the user can proceed to his or her normal OTP login. The user can also perform the "Check Web Site" function described above if he or she feels uncertain at any time before and/or during the login session.

In a user registration process for embodiments of the invention, a user authenticates to the financial institution's OTP system via the original login method and selects "OTP Signup". The user is then asked to enter a PIN for the OTP generator application token. For added security, the user may optionally be asked to enter a device unique ID, such as the IMEI number of his or her GSM cell phone (retrievable, for example, by entering *#06 # on almost any GSM phone) that contains the OTP generator application. For non-GSM phones, for example, the ESN number is used as the device unique ID. The registration process is thus completed. In an activation procedure for embodiments of the invention, the financial institution sends the user an activation code along with instructions and a URL for the OTP software download via an alternative channel such as an email, postal mail, or the like. The user downloads and installs the OTP generator application into his or her device, and the financial institution enables OTP login for the particular user. Thereafter, the user starts the OTP generator application in his or her device and enters the activation code received. The OTP generator application is now ready for use, and the user can generate a one-time password with the OTP generator application by entering the PIN he selected during the registration process.

In a token PIN change procedure for embodiments of the invention, a user authenticates to the financial institution server and selects, for example, "OTP Token PIN Change". The user enters a new token PIN twice and the financial institution server verifies that the two entries of the new token PIN agree and commits the PIN change. The user can now use the new PIN for OTP generation. There is no need for PIN change on the OTP token device itself because it does not need to know the correct token PIN. For added security, the financial institution may ask for the old PIN during the PIN change process for verification.

As previously described, a distinct feature of the OTP token for embodiments of the invention is that the OTP token not only supports one-time password generation of various OTP algorithms, it also acts as a challenge-response validator to provide mutual authentication between the user and, for example, the web site, email or other communication channel. The challenge and response validation capability in the OTP token for embodiments of the invention can be used to defeat the threat of phishing email and a spoofed web site, provided for example, the client is a registered user of the OTP token and uses the OTP token as the validation device.

Figure 5:
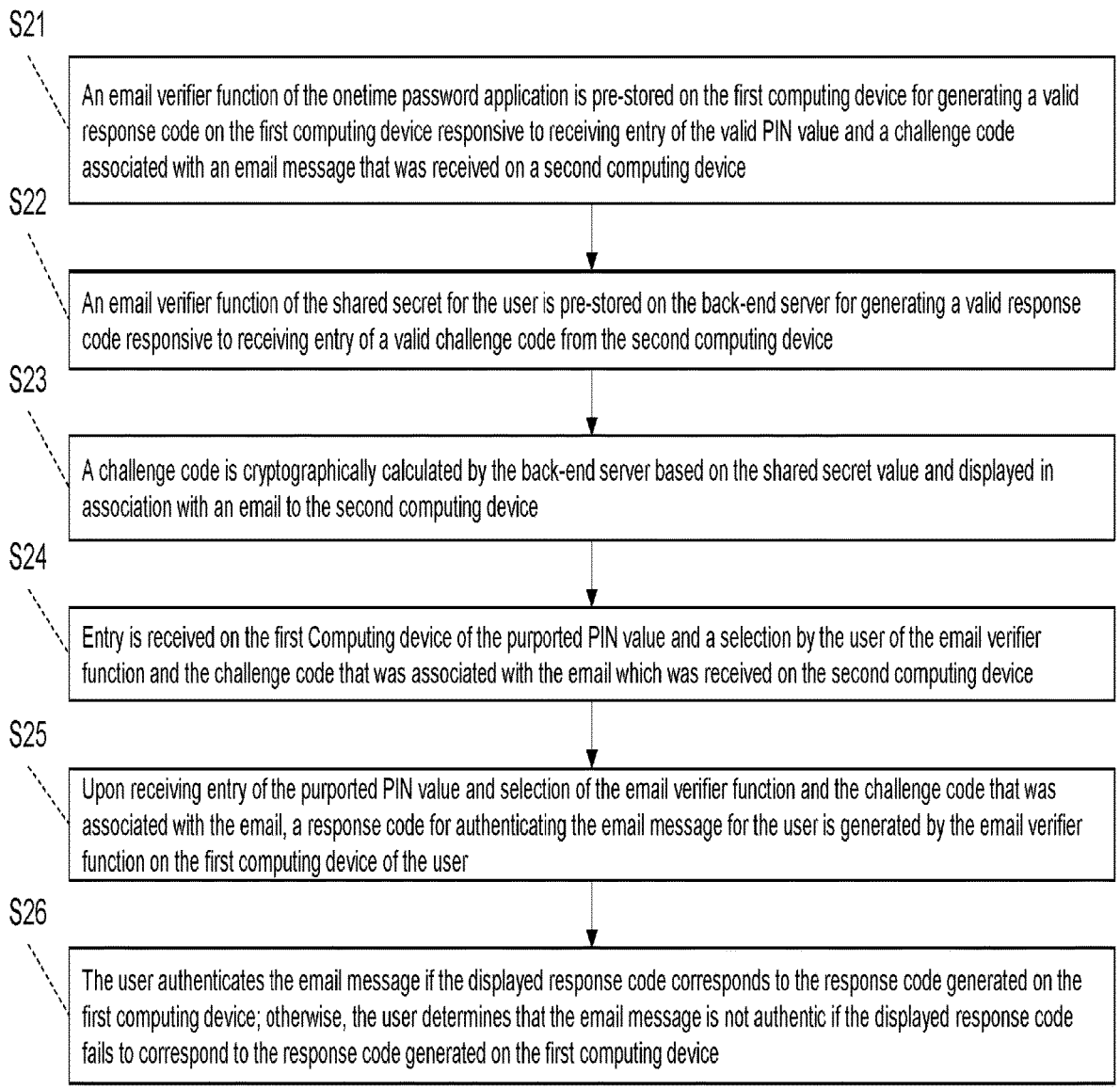
FIG. 5 is a flow chart that illustrates an example of the process of email authentication for embodiments of the invention.

FIG. 5 is a flow chart that illustrates an example of the process of email verification for embodiments of the invention. Referring to FIG. 5, at S21, an email verifier function of the one-time password application is pre-stored on the first computing device 14 for generating a valid response code on the first computing device responsive to receiving entry of the valid PIN value and a challenge code associated with an email message that was received on a second computing device 12. At S22, an email verifier function of the shared secret for the user is pre-stored on the back-end server 18 for generating a valid response code responsive to receiving entry of a valid challenge code from the second computing device 12. At S23, a challenge code is cryptographically calculated by the back-end server 18 based on the shared secret value and include in an email to the second computing device 12. Thereafter, upon receiving entry on the first computing device 14 of the purported PIN value and a selection by the user 10 of the email verifier function and the challenge code associated with the email that was received on the second computing device 12 at S24, a response code for authenticating the email message for the user 10 is generated by the email verifier function on the first computing device 14 at S25. At S26, the user 10 can authenticate the email message if the displayed response code corresponds to the response code generated on the first computing device 14. Otherwise, the user can determine that the email message is not authentic if the displayed response code fails to correspond to the response code generated on the first computing device 14.

There remains a slight possibility that the email could have been intercepted by a phisher, because emails use a store and forward protocol that typically goes through many hops before reaching the client. A phisher can click on the link first to harvest the e-response code for the client from the financial institution and alter the email's web links in the email to a spoofed web site while keeping the e-code intact to fool the user into believing that the email was received from his or her financial institution. The phisher must also have modified the spoofed site to target this particular client, because the challenge-response algorithm also uses user specific OTP elements such as PIN and shared secrets. Since the e-response is time sensitive, the phisher's spoofed site targeting this particular client remains good only during a window of time which is used by the challenge-response time sensitive algorithm, such as within one hour.

It is extremely unlikely that a phisher would go to so much trouble to set up a customized spoofed site, a spoofed email, and the like, for the purpose of targeting one particular client on the off chance that the client will read and respond to an email within the time window, such as one hour, in order to fool the client by the spoofed web site. However, in order to totally eliminate that possibility, the OTP token solution for embodiments of the invention provides a second validation which is the web site challenge validation. In addition to the e-response code match, embodiments of the invention also provide a "Challenge the Web Site" function in the OTP token validation suite which allows the client to use his or her OTP token to generate a random challenge, referred to herein as "the w-code", and produce a response to the challenge on the OTP device, referred to herein as "the w-response".

In the web site challenge validation process, as usual, the user must enter a correct PIN to generate a response back to the web site. In addition to the e-response code mentioned above, an authentic financial institution web site should also have a text box and a button that allows the user to challenge the web site as part of the mutual authentication previously described. The client enters the generated challenge or w-code from his or her OTP token into the challenge field of the web site and clicks on a "Challenge Web Site" button to get back a response. If the web site response matches the w-response code in the OTP token, the web site is genuine, because generating the correct response requires knowledge of the client's shared secrets and PIN. This challenge and response algorithm can also be made time-sensitive, if desired.

Returning to the possibility that an attacker's spoofed web site utilizes automated proxying to pass the user's input to an authentic web site, to harvest the responses in real-time from the authentic web site, and then to display the responses in the spoofed web site to fool the user to believe the spoofed site is the authentic web site by answering the challenge correctly, this problem can be dealt with passively using the historic geo-locations, IP subnet/addresses (a.k.a. risk based authentication) that a user typically uses to filter out such proxy based attacks and to raise alerts. Statistically, if the same IP is used to access a web site with many different user-unique ID strings, it is very likely that such IP address is a spoofed site with automated proxying which should trigger an alert to place the site, for example, on a bad IP list/blocked list. On the active defense side, there are various techniques to make harvesting the response from an authentic web site very difficult if it is automated. If such approaches still do not prevent an attack, the out-of-band technique described in the following paragraph will break the proxy loop via an alternative channel confirmation method.

The only other threat left to address is a real-time man-in-the-middle attack which can be solved by using out-of-band alternative channel confirmation mechanisms to protect high-value and high-risk transactions. For example, SMS messages, email or phone call to the user with a confirmation code can be delivered out-of-band to the user for these high-value/high-risk transactions. Such confirmation code can be generated by the back-end server using the shared secret of the user's OTP and/or the transaction data that can be verified by the mobile device for OTP generation with a function similar to the challenge-response web site verifier. This way, the user can validate the transaction using the same mobile device with the confirmation code received from the alternative channel where the man-in-the-middle has no access. The man-in-the-middle may be able to observe the transaction, but it cannot alter it, replay it with hacked data, or reuse the collected login credentials and OTP at a later time. On the other hand, the e-code and w-code may contain, for example, a check digit for code entry error detection using simple checksum algorithm for small numbers such as the ISBN check digit algorithm. The e-code in the email can also contain verification digits, such as a mini-challenge and response pair, for the OTP token to verify that the e-code is correctly entered as long as the number of digits in the e-code remains reasonable simple for a client to enter correctly. In addition, the e-code can contain data for the email recipient to validate that it came from the financial institution. For added security and privacy, URL links in emails should utilize secure SSL channel (i.e. HTTPS). In other words, the web page that a user sees when he or she clicks on the email should web link to 'HTTPS only' by limiting that page to be accessible only via the HTTPS port (e.g. port 443).

In a policy change and updates aspect for embodiments of the invention, the financial institution can initiate, for example, token policy changes, OTP algorithm changes, and parameter updates via an "update code". For example, the update code can be used for switching OTP algorithms from event-based to time-plus-event-based, changing OTP time window size, and renewing token expiration date and the like for security, IP rights, and/or performance reasons. The update code can also alter the composition of the OTP without requiring the user to change his or her token PIN. The financial institution initiates policy changes and issues the user update code via an alternative channel. The user starts the OTP generator application in his or her device and selects, for example, "Enter Update Code" from the menu. The user enters the update code and the OTP application is updated with the policy change.

A further aspect of embodiments of the invention includes policy driven OTP that relates to the generation of OTP values. The ability to update the OTP personalized data, algorithm type, and security policy by a financial institution, such as a bank, at will provides an excellent way to reduce the possibility of compromised OTP devices. This is especially true for software based OTP implementation that runs on user devices such as mobile phones, PDAs, and PCs. Hackers may use viruses, malware, keyloggers, etc. to monitor and export information from the device for illegal activities. In the case of static passwords, the security policy imposes password composition rules and periodic password change to reduce the possibility of password compromise. However, it adds burdens to the user to use difficult-to-remember passwords and to change them regularly. This may be acceptable for corporate employees, but it may not be acceptable for individual bank customers. The policy driven OTP system for embodiments of the invention solves this problem with an innovative solution that alters the OTP without requiring the user to change his OTP PIN.

In the policy driven OTP aspect of embodiments of the invention, an "update" function is added to the OTP client software on the mobile phone to support modification of OTP parameters and security policy, such as which OTP algorithm to use via an update code. The financial institution can initiate an OTP policy change from the OTP management system and issue an update to any user at any time based on business rules, security policy change, or threat detections. For example, the financial institution can push an update to the user in every 20 good logons, every month, when the user account has many bad login attempts prior to the successful login, when the financial institution decides to switch from one OTP algorithm to another, etc. The update code can be delivered to the user during a logon session (e.g. a user has login successfully) or via an alternative channel (e.g. email, PIN mailer, etc.). Note that the update code is used incrementally to modify the existing OTP parameters and security policy of the OTP client software. This makes intercepting the update code useless to the attacker because it needs to combine with the existing OTP parameters and PIN to generate the new shared secret.

In the policy driven OTP aspect of embodiments of the invention, the financial institution can manage the OTP tokens as if managing regular static passwords. For example, the financial institution can enforce regular password change without requiring the user to change his OTP PIN. The OTP token can be "expired" by the financial institution at anytime by issuing an update code to that token. Changing the underlying parameters and/or components of the OTP is like changing a static password. To the user, it is as simple as entering the received update code once. The beauty of this approach is that the user can still use the same old PIN to generate OTP's after the update, but the generated OTP will be totally different because the shared secret, parameters, and/or OTP algorithm underneath are no longer the same. In addition, if a particular OTP algorithm is no longer secure or it has performance issues, the financial institution can issue an update code to switch the characteristics of the OTP client software to use a different algorithm or OTP factor combination. In this way, the financial institution can control everything related to the OTP client software/token from the OTP management server using the update code without having to upgrade the OTP client software. In addition, mutual authentication can be performed between user and web site by combining the anti-phishing aspect and the policy driven OTP aspect of embodiments of the invention.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method for secure user authentication, the method comprising:
  receiving, by a validation server executing a one-time password (OTP) generator, a PIN from a user device associated with a user, wherein the PIN is not stored at the user device;
  dynamically generating, by the validation server, a shared secret based upon the PIN received from the user device and personalized OTP data;
  generating, by the validation server, an OTP based on the shared secret and one or more moving factors of the OTP generator, wherein the OTP has a time-sensitive expiration according to at least one moving factor;
  presenting, by the validation server, the OTP for display on a graphical user interface for the user via a first channel;
  receiving via a second channel, by the validation server, the OTP and a user credential associated with the user from a challenge website of a second server coupled to the validation server; and
  responsive to the validation server determining that the user credential and the OTP received from the challenge web site is valid according to a record of the user stored in a non-transitory machine-readable storage media:

transmitting, by the validation server, access rights for the challenge web site of the second server for the user according to the record of the user.

2. The method according to claim 1, further comprising receiving, by the challenge website of the second server, entry of the OTP from the user device.

3. The method according to claim 1, further comprising receiving, by the challenge website of the second server, entry of the OTP from a second user device.

4. The method according to claim 1, wherein the validation server deletes the shared secret after generating the OTP.

5. The method according to claim 1, further comprising:
calculating, by the validation server, a second OTP based upon the moving factor of the OTP generator and the PIN stored in the record of the user; and
authenticating, by the validation server, the user device upon the validation server determining that the OTP generated for display on the graphical user interface matches the second OTP.

6. The method according to claim 1, wherein the OTP generator comprises an algorithm including the one or more moving factors for generating successive different valid OTP values, and wherein the one or more moving factors include at least one of an event-based count or increment, a clock, or a computation of actual time.

7. The method according to claim 1, wherein the user device comprises one of a PC or a laptop computer, and wherein the OTP is entered from a second user device comprising a mobile phone.

8. The method according to claim 1, wherein the OTP includes at least one of a time-sensitive challenge code or a time-sensitive response code.

9. The method according to claim 1, wherein determining that the OTP is valid includes calculating, by the validation server, a time frame window of the OTP is not expired according to the at least one moving factor.

10. The method according to claim 1, wherein the PIN is stored into the record of the user during in an interactive enrollment session between the user at the user device and the validation server.

11. A system for secure user authentication, the system comprising:
a validation server having a processor coupled to memory that executes a one-time password (OTP) generator, the validation server being programmed for:
receiving a PIN from a first user device associated with a user, wherein the PIN is not stored at the user device;
dynamically generating a shared secret based upon the PIN received from the user device and personalized OTP data;
generating an OTP based on the shared secret and one or more moving factors of the OTP generator, wherein the OTP has a time-sensitive expiration according to at least one moving factor;
presenting the OTP for display on a graphical user interface for the user via a first channel;
receiving via a second channel the OTP and a user credential associated with the user from a challenge website of a second server coupled to the validation server; and
responsive to the validation server determining that the user credential and the OTP received from the challenge web site is valid according to a record of the user stored in a non-transitory machine-readable storage media:
transmitting access rights for the challenge web site of the second server for the user according to the record of the user.

12. The system according to claim 11, wherein the challenge website of the second server receives entry of the OTP from the user device and provides the OTP to the validation server.

13. The system according to claim 11, wherein the challenge website of the second server receives entry of the OTP from a second user device and provides the OTP to the validation server.

14. The system according to claim 11, wherein the validation server is configured to delete the shared secret after generating the OTP.

15. The system according to claim 11, wherein the validation server is further programmed for:
calculating a second OTP based upon the moving factor of the OTP generator and the PIN stored in the record of the user; and
authenticating the user device upon the validation server determining that the OTP generated for display on the graphical user interface matches the second OTP.

16. The system according to claim 11, wherein the OTP generator comprises an algorithm including the one or more moving factors for generating successive different valid OTP values, and wherein the one or more moving factors include at least one of an event-based count or increment, a clock, or a computation of actual time.

17. The system according to claim 11, wherein the user device comprises one of a PC or a laptop computer, and wherein the OTP is entered from a second user device comprising a mobile phone.

18. The system according to claim 11, wherein the OTP includes at least one of a time-sensitive challenge code or a time-sensitive response code.

19. The system according to claim 11, wherein when determining that the OTP is valid, the validation server is further programmed for:
calculating a time frame window of the OTP is not expired according to the at least one moving factor.

20. The system according to claim 11, wherein the PIN is stored into the record of the user during in an interactive enrollment session between the user at the user device and the validation server.

* * * * *